(12) United States Patent
Kim

(10) Patent No.: US 9,122,062 B2
(45) Date of Patent: Sep. 1, 2015

(54) POLYGON MIRROR, LIGHT SCANNING UNIT EMPLOYING THE SAME, AND ELECTROPHOTOGRAPHIC IMAGE FORMING APPARATUS

(71) Applicant: Samsung Electronics Co., Ltd., Suwon-si (KR)

(72) Inventor: Su-whan Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/158,155

(22) Filed: Jan. 17, 2014

(65) Prior Publication Data

US 2014/0232804 A1      Aug. 21, 2014

(30) Foreign Application Priority Data

Feb. 18, 2013   (KR) ........................ 10-2013-0016974

(51) Int. Cl.
*G02B 26/12*        (2006.01)
*G03G 15/043*       (2006.01)
*G03G 15/04*        (2006.01)

(52) U.S. Cl.
CPC ............ *G02B 26/127* (2013.01); *G02B 26/123* (2013.01); *G03G 15/043* (2013.01); *G03G 15/04072* (2013.01)

(58) Field of Classification Search
CPC .. G02B 126/127; G02B 26/12; G02B 26/123; G03G 15/043
USPC ........................................................ 347/261
See application file for complete search history.

(56) References Cited

U.S. PATENT DOCUMENTS

| 5,748,357 A * | 5/1998 | Park .......................... 359/216.1 |
| 8,223,184 B2 * | 7/2012 | Kato ............................. 347/241 |
| 2004/0036757 A1* | 2/2004 | Yoshida ....................... 347/132 |

FOREIGN PATENT DOCUMENTS

KR   100497487 B1 *  2/2003
KR   10-0497487      7/2005

\* cited by examiner

*Primary Examiner* — Sarah Al Hashimi
(74) *Attorney, Agent, or Firm* — Staas & Halsey LLP

(57) ABSTRACT

A polygonal rotating mirror, a light scanning unit employing the polygonal rotating mirror, and an electrophotographic image forming apparatus are shown. The polygonal rotating mirror is employed in the light scanning unit for scanning a light beam and includes a plurality of reflective surfaces enclosing outer side surfaces thereof. One of the plurality of reflective surfaces is a reference surface, a region of the reference surface where a light beam for a synchronization signal is to be incident is formed as a non-reflective region, and regions of the remaining reflective surfaces of the plurality of reflective surfaces where a light beam for a synchronization signal is to be incident, are formed as reflective regions.

18 Claims, 8 Drawing Sheets

POLYGON MIRROR, LIGHT SCANNING UNIT EMPLOYING THE SAME, AND ELECTROPHOTOGRAPHIC IMAGE FORMING APPARATUS

CROSS-REFERENCE TO RELATED APPLICATIONS

This application claims the priority benefit of Korean Patent Application No. 10-2013-0016974, filed on Feb. 18, 2013, in the Korean Intellectual Property Office, the disclosure of which is incorporated herein in its entirety by reference.

BACKGROUND

1. Field

Embodiments relate to an electrophotographic image forming apparatus, and more particularly, to a polygonal rotating mirror, a light scanning unit employing the same to process a synchronization signal and compensate for an image, and an electrophotographic image forming apparatus employing the light scanning unit.

2. Description of the Related Art

An image forming apparatus, such as a laser printer, forms an image by scanning a light beam onto a photosensitive drum by using a light scanning device to form an electrostatic latent image, developing the electrostatic latent image into a toner image by using toner, and transferring the developed toner image onto a printing medium.

A light scanning device uses a polygonal rotating mirror including a plurality of reflective surfaces to scan a light beam onto a photosensitive drum. Light beams are continuously scanned as the polygonal rotating mirror rotates. In a single color image forming apparatus for producing a single color image, a light scanning device scans a light beam by using one polygonal mirror. In a color image forming apparatus for producing a color image, a light scanning device scans four light beams corresponding to the respective colors of black (K), cyan (C), magenta (M), and yellow (Y) by using one or more polygonal rotating mirrors. For example, the light scanning device may use a single polygonal rotating mirror to scan four light beams corresponding to four colors of black (K), cyan (C), magenta (M), and yellow (Y), two polygonal rotating mirrors to scan light beams corresponding to two colors, respectively, or four polygonal rotating mirrors to scan light beams of a single color, respectively.

In order for a light scanning device to scan a light beam onto a photosensitive drum with a correct timing, a synchronization signal detection unit for detecting a horizontal synchronization signal of a scanned light beam is required.

A conventional synchronization signal detection unit detects a horizontal synchronization signal by using beam detecting sensors. The detected horizontal synchronization signal is then transferred to a printer video controller (PVC). The PVC transmits video data to a laser diode driver (LDD) in a light scanning device according to the received horizontal synchronization signal, and the LDD controls on/off operation of a light source according to the video data so as to emit a light beam.

SUMMARY

When a light beam is scanned by using a polygonal rotating mirror having a plurality of reflective surfaces, a period of a synchronization signal may vary slightly according to states of machined reflective surfaces and angles between adjacent reflective surfaces, which may adversely affect image quality. Thus, print quality may be degraded. To overcome these problems, one or more embodiments provide a polygonal rotating mirror designed to effectively compensate for variations in a period of a synchronization signal, a light scanning unit employing the polygonal rotating mirror, and an electrophotographic image forming apparatus.

According to an aspect of one or more embodiments, there is provided a polygonal rotating mirror employed in a light scanning unit for scanning a light beam. The polygonal rotating mirror includes a plurality of reflective surfaces enclosing outer side surfaces thereof. One of the plurality of reflective surfaces is a reference, and a region of the reference surface where a light beam for a synchronization signal is to be incident is formed as a non-reflective region, and regions of the remaining reflective surfaces of the plurality of reflective surfaces where a light beam for a synchronization signal is to be incident, are formed as reflective regions.

The non-reflective region of the reference surface may be disposed in proximity to an edge of the reference surface.

The non-reflective region of the reference surface may be disposed at a starting position of the reference surface with respect to a rotation direction of the polygonal rotating mirror.

According to an aspect of one or more embodiments, there is provided a light scanning unit including: a light source unit which emits a light beam; a polygonal rotating mirror including a plurality of reflective surfaces enclosing outer side surfaces thereof, which deflects and scans the light beam emitted by the light source unit in a main scanning direction; and a synchronization detecting sensor which receives a portion of the light beam reflected by the polygonal rotating mirror and which generates a first horizontal synchronization signal. One of the plurality of reflective surfaces is a reference, and a region of the reference surface where a light beam for a synchronization signal is to be incident is formed as a non-reflective region, and regions of the remaining reflective surfaces of the plurality of reflective surfaces where a light beam for a synchronization signal is to be incident, are formed as reflective regions.

The light source unit may include a single light source which emits a light beam. In this example, one light beam is deflected and reflected by a single polygonal rotating mirror.

Alternatively, the light source unit may include four light sources, each light source emitting one light beam. Two light beams of the four light beams emitted by the light source unit may be deflected and scanned by one reflective surface of the polygonal rotating mirror, and the remaining two light beams are deflected and scanned by another reflective surface of the polygonal rotating mirror. In this example, the four light beams are deflected and reflected by a single polygonal rotating mirror.

The light source unit includes four light sources, each light source emitting one light beam. Two light beams of the four light beams emitted by the light source unit are deflected and scanned by different reflective surfaces of the polygonal rotating mirror. The remaining two light beams are deflected and scanned by different reflective surfaces of another polygonal mirror. In this example, two light beams are deflected and reflected by one polygonal rotating mirror.

According to an aspect of one or more embodiments, there is provided an electrophotographic image forming apparatus including a light scanning unit which scans a light beam and a video signal processor including a second horizontal synchronization signal generating unit which counts a synchronization signal offset upon receiving the first horizontal synchronization signal from the synchronization detecting sensor and which generates a second horizontal synchronization signal regarding the reference surface, and a video controller which transfers video data to the light scanning unit based on the first and second horizontal synchronization signals. The light scanning unit includes: a light source unit which emits a light beam; a polygonal rotating mirror including a plurality of reflective surfaces enclosing outer side surfaces thereof, which deflects and scans the light beam emitted by the light source unit in a main scanning direction; and a synchronization detecting sensor which receives a portion of the light beam reflected by the polygonal rotating mirror and generating a first horizontal synchronization signal. One of the plurality of reflective surfaces is a reference, and a region of the reference surface where a light beam for a synchronization signal is to be incident is formed as a non-reflective region, and regions of the remaining reflective surfaces of the plurality of reflective surfaces where a light beam for a synchronization signal is to be incident, are formed as reflective regions.

The synchronization signal offset may be one preset period of a horizontal synchronization signal.

The video signal processor may be a central processing unit (CPU) or a hyper print video controller (HPVC).

The electrophotographic image forming apparatus may further include: develop devices which develop electrostatic latent images formed by exposing light beams scanned by the light scanning unit and which form a toner image; a transfer device which transfers the toner image onto a printing medium; and a fixing device which fixes the transferred toner image on the printing medium.

The polygonal rotating mirror includes a reference surface regarding a synchronization signal, and the light scanning unit employing the polygonal rotating mirror and the electrophotographic image forming apparatus use horizontal synchronization signals regarding the reflective surfaces other than the reference surface to generate a horizontal synchronization signal regarding the reference surface, thereby solving problems due to non-uniform deformation of the reflective surfaces. Furthermore, video data can be corrected for each line in a printed image, thereby improving image quality.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
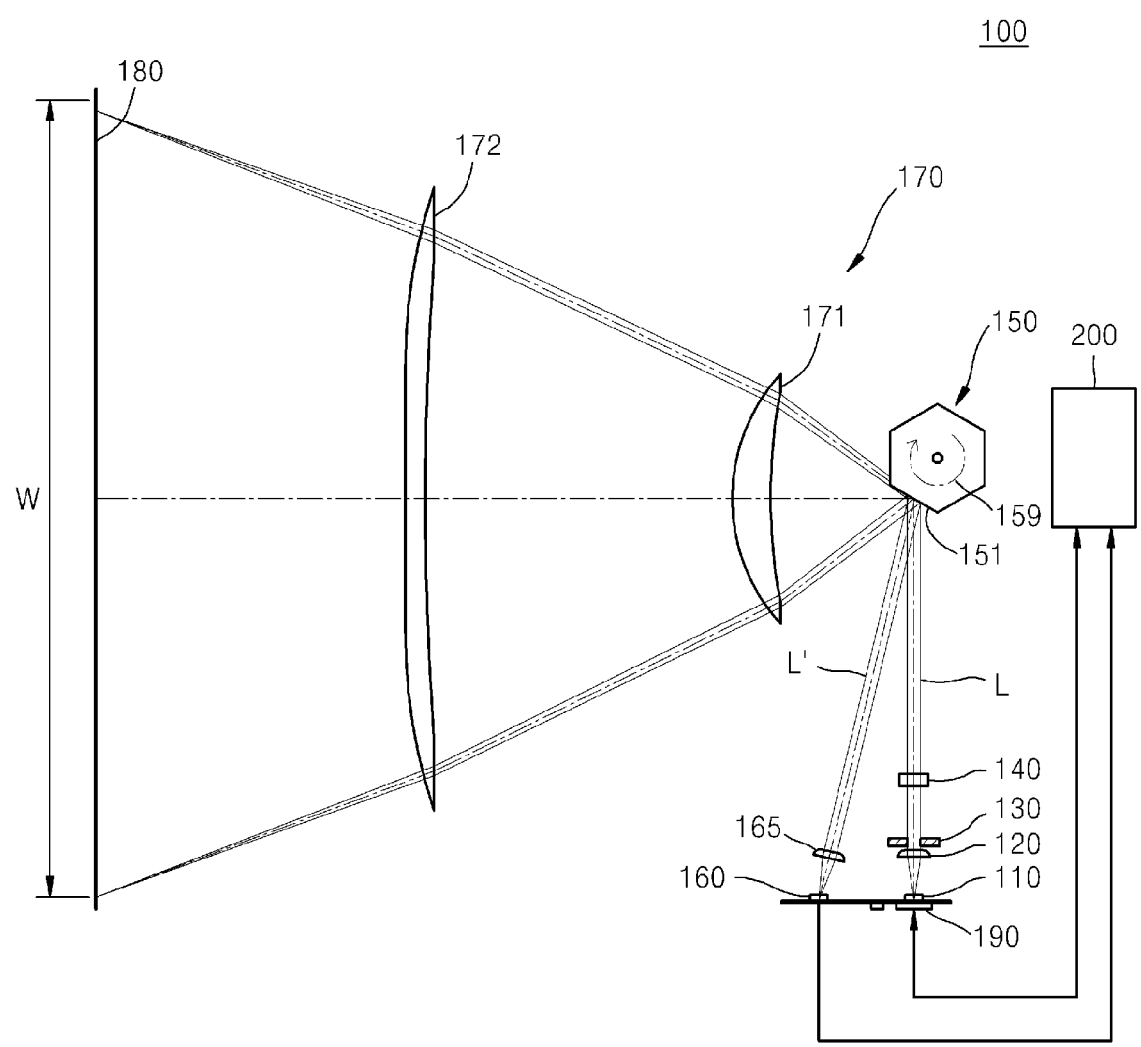
FIG. 1 is a diagram of a light scanning unit and a signal processor in an image forming apparatus according to an embodiment.

Reference will now be made in detail to embodiments, examples of which are illustrated in the accompanying drawings, wherein like reference numerals refer to like elements throughout. Embodiments are described below by referring to the figures. In the figures, sizes and thicknesses of layers and regions are exaggerated for clarity.

As used herein, the term "and/or" includes any and all combinations of one or more of the associated listed items.

Throughout this specification, a main scanning direction refers to a direction in which scanning lines are drawn on a scanned surface (180 in FIG. 1). That is, the main scanning direction is a direction in which a spot of a light beam L deflected by a polygonal rotating mirror (150 in FIG. 1) and formed on the scanned surface 180 propagates on the scanned surface 180. The polygonal rotating mirror may rotate in a direction 159. Since a light path of a light beam L may be changed by a light path changing member such as a reflective mirror, the main scanning direction may be changed as the light path is changed. Also, when the presence of the light path changing member is not considered, the main scanning direction is equal to the direction of scanning lines on the scanned surface because the main scanning direction on the light path of the light beam L corresponds to the main scanning direction on the scanned surface. A sub scanning direction refers to a direction that is perpendicular to both the main scanning direction and a proceeding direction (i.e., light path) of a light beam L deflected by the polygonal rotating mirror 150. Similarly, since a light path of the light beam L may be changed by a light path changing member such as a reflective mirror, the sub scanning direction may be changed as the light path is changed. When the presence of the light path changing member is not considered, the sub scanning direction is the same as a direction of a rotational axis of the polygonal rotating mirror 150. In addition, a main scanning plane is defined as a plane on which both a proceeding direction of a light beam L and a main scanning direction, i.e., a plane across which a light beam L is deflected and scanned by the polygonal rotating mirror 150. A sub scanning plane refers to a plane perpendicular to the main scanning plane.

FIG. 1 is a diagram of a light scanning unit 100 and a video signal processor 200 in an electrophotographic image forming apparatus according to an embodiment. FIG. 1 shows an optical arrangement of the light scanning unit 100 with respect to a main scanning plane, in which an optical path of an image forming optical system 170 is not folded for convenience of illustration.

Referring to FIG. 1, the electrophotographic image forming apparatus according to an embodiment includes the light scanning unit 100 and the video signal processor 200 for transmitting video data to the light scanning unit 100.

The light scanning unit 100 includes a light source 110, a polygonal rotating mirror 150, and a synchronization detecting sensor 160.

The light source 110 emits a light beam L that is modulated according to image information, and may be a semiconductor laser diode for emitting a laser beam. A laser diode driver (LDD) 190 may be mounted on a circuit board where the light source 110 is disposed.

The polygonal rotating mirror 150 deflects and scans a light beam L to a scanned surface 180.

Figure 2:
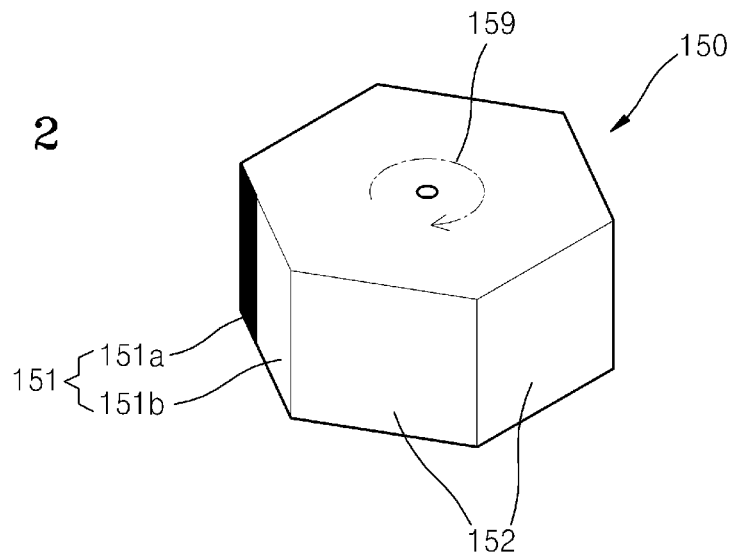
FIG. 2 is a schematic perspective view of a polygonal rotating mirror in the light scanning unit shown in FIG. 1.
Figure 3A:
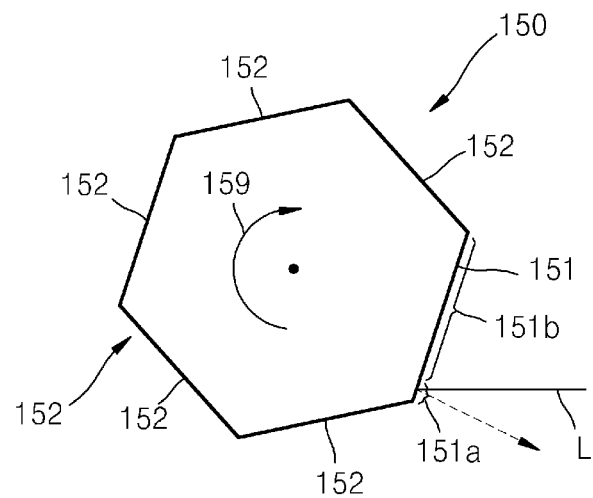
FIG. 3A illustrates a path of a light beam incident on a reference surface of the polygonal rotating mirror of FIG. 2.
Figure 3B:
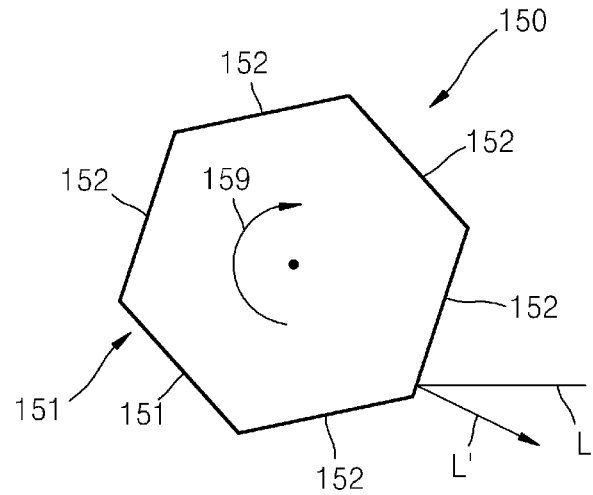
FIG. 3B illustrates a path of a light beam incident on reflective surfaces of the polygonal rotating mirror of FIG. 2 other than the reference surface thereof.

FIG. 2 is a schematic perspective view of the polygonal rotating mirror 150 in the light scanning unit 100. FIG. 3A illustrates a path of a light beam L1 incident on a reference surface 151 of the polygonal rotating mirror 150, and FIG. 3B illustrates a path of a light beam L' incident on reflective surfaces 152 of the polygonal rotating mirror 150, other than the reference surface 151 thereof.

Referring to FIG. 2, the polygonal rotating mirror 150 may have six reflective surfaces (i.e., a hexagon mirror) and rotate at a constant speed using a driver (not shown) such as a spindle motor.

One of the six reflective surfaces is the reference surface 151, and the remaining five reflective surfaces are general reflective surfaces 152. The reference surface 151 includes a non-reflective region 151a. The remaining region of the reference surface 151 may be a reflective region 151b a1 which is darker than reflective regions. The non-reflective region 151a is disposed at a region where a light beam for a synchronization signal is to be incident. Thus, a light beam for a synchronization signal is not reflected off the reference surface 151. For example, as shown in FIG. 3A, the non-reflective region 151a may be located toward the starting direction of rotation of the polygonal rotating mirror 150, i.e., a point at which scanning of a light beam L starts. In other words, the non-reflective region 151a may be located adjacent to an edge where the reference surface 151 meets with one of its two adjacent surfaces near the start point of scanning. The reflective region 151b of the reference surface 151 normally reflects and scans a light beam L to the scanned surface (180 in FIG. 1).

Each of the remaining reflective surfaces 152 except for the reference surface 151 may be entirely a reflective region. As shown in FIG. 3B, all the remaining reflective surfaces 152 reflect the light beam L' for a synchronization signal. When the total number of the reflective surfaces of the polygonal rotating mirror 150 is N, the light beam L' for a synchronization signal may be generated N−1 times during one rotation of the polygonal rotating mirror 150. For example, when the polygonal rotating mirror 150 is a hexagon mirror like in an embodiment, the number of light beams L' generated during one rotation of the polygonal rotating mirror 150 may be 5.

Referring to FIG. 1, an incidence optical system may be disposed on a light path of the light beam L between the light source 110 and the polygonal rotating mirror 150. The incidence optical system may include a collimating lens 120, a slit 130, and a cylindrical lens 140. Some of the collimating lens 120, the slit 130, and the cylindrical lens 140 may be omitted or formed integrally with other optical components. The collimating lens 120 is a condenser lens that converts the light beam L emitted from the light source 110 into parallel light or convergent light. The slit 130 is an aperture which adjusts a diameter and a shape of the light beam L. The cylindrical lens 140 is an anamorphic lens that linearly images on a reflective surface of the polygonal rotating mirror 150 by focusing the light beam L in a direction corresponding to the main scanning direction and/or the sub scanning direction.

The image forming optical system 170 is disposed between the polygonal rotating mirror 150 and the scanned surface 180 and includes first and second scanning lenses 171 and 172 that image the light beam L deflected by the polygonal rotating mirror 150 on the scanned surface 180. The first and second scanning lenses 171 and 172 may be f-theta (fθ) lenses which focuses the light beam L and correct the light beam L to scan the light beam L onto the scanned surface 180 at a constant velocity. The first scanning lens 171, which is close to the polygonal rotating lens 150, may be designed to have approximately zero refractive power in the sub scanning direction. On the other hand, the second scanning lens 172 disposed far from the polygonal rotating mirror 150 may be designed to have a positive refractive power in the sub scanning direction. Although the image forming optical system 170 includes the first and second scanning lenses 171 and 172, an optical configuration of the image forming optical system 170 may be changed in various ways. For example, the image forming optical system 170 may be configured by disposing one lens or three or more lenses. To reduce the size of the light scanning unit 100 and image the light beam L scanned by the light scanning unit 100 in a predetermined direction, reflective members (not shown) may be disposed within the image forming optical system 170.

The synchronization detecting sensor 160 may be, for example, a photo diode or a photo sensor integrated circuit (IC). The synchronization detecting sensor 160 may be disposed on a portion of the circuit board towards which a light beam L' (hereinafter referred to as a synchronization detecting light beam L') is directed so as to detect a start point of one scanning period of a light beam L scanned by the light deflector 140, wherein the synchronization detecting light beam L' corresponds to a point just before the start point of one effective scanning period of the light beam L reflected off one reflective surface 152 of the polygonal rotating mirror 150. The synchronization detecting light beam L' detected by the synchronization detecting sensor 160 is converted into a horizontal synchronization signal (hereinafter referred to as a first horizontal synchronization signal) indicating a beginning of scanning of the light beam L. Since the reference reflective surface 151 of the polygonal rotating mirror 150 does not reflect the synchronization detecting light beam L' as described above, the synchronization detecting sensor 160 does not detect a horizontal synchronization signal for the reference reflective surface 151. While FIG. 1 shows that the synchronization detecting sensor 160 and the light source 110 are disposed together on a single circuit board, the synchronization detecting sensor 160 and the light source 110 may be installed on separate circuit boards.

A synchronization detecting lens 165 for focusing the synchronization detecting light beam L' on the synchronization detecting sensor 160 may be interposed between the synchronization detecting sensor 160 and the polygonal rotating mirror 150. If necessary, a light path change member (e.g., a mirror) (not shown) may be disposed on a light path of the synchronization detecting light beam L' so as to allow flexibility in disposing the synchronization detecting sensor 160.

The first horizontal synchronization signal detected by the synchronization detecting sensor 160 is subjected to analog-to-digital (A/D) conversion and is transferred to the video signal processor 200.

Figure 4:
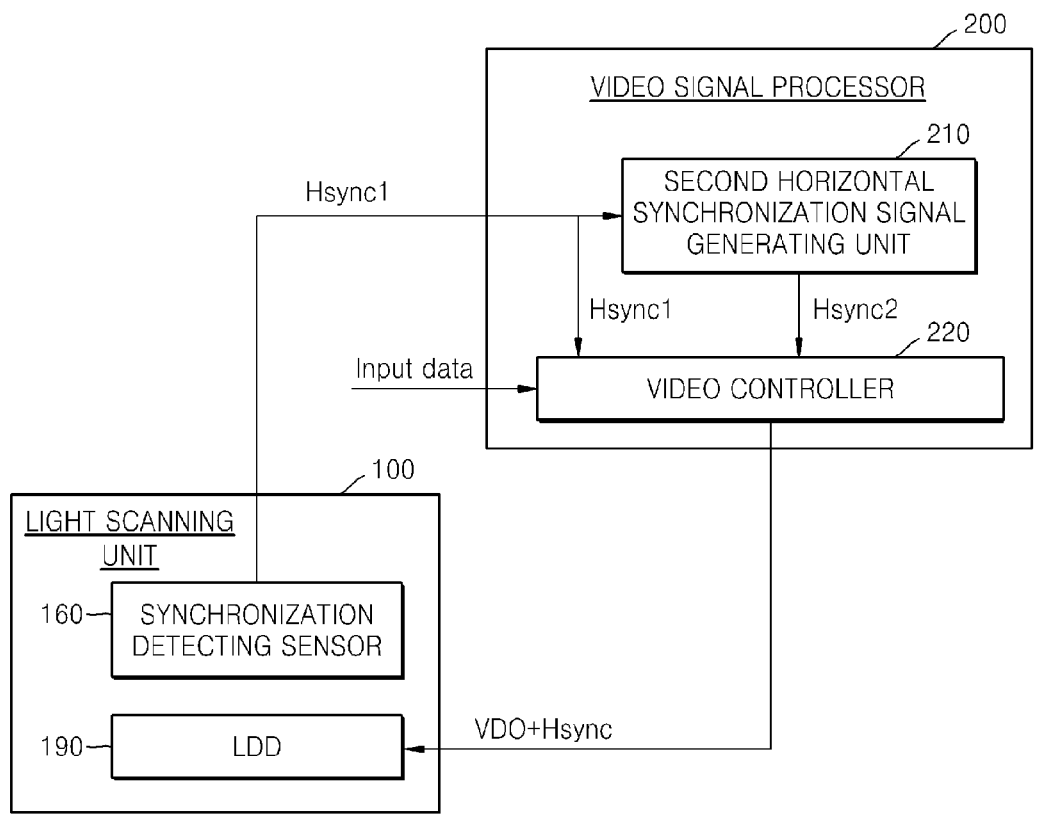
FIG. 4 is a block diagram of the light scanning unit and the video signal processor in FIG. 1.

FIG. 4 is a block diagram of the light scanning unit 100 and the video signal processor 200. Referring to FIG. 4, the video signal processor 200 includes a second horizontal synchronization signal generating unit 210 and a video controller 220. The video signal processor 200 may be a central processing unit (CPU) installed in a main board of the image forming apparatus or a hyper print video controller (HPVC).

The second horizontal synchronization signal generating unit 210 has preset information about a horizontal synchronization signal. The second horizontal synchronization signal generating unit 210 generates a second horizontal synchronization signal Hsync2 based on a preset horizontal synchronization signal and a first horizontal synchronization signal Hsync1 time-sequentially received from the synchronization detecting sensor 160. The second horizontal synchronization signal Hsync2 corresponds to a horizontal synchronization signal omitted as the synchronization detecting light beam L' is not reflected off the reference reflective surface 151.

The video controller 220 receives video data VDO and transmits the video data VDO to an LDD 190 according to the horizontal synchronization signal detected by the synchronization detecting sensor 160 and the second horizontal synchronization signal Hsync2 generated by the second horizontal synchronization signal generating unit 210.

An operation of the electrophotographic image forming apparatus according to an embodiment is now described with reference to FIGS. 1 through 6D.

Figure 5:
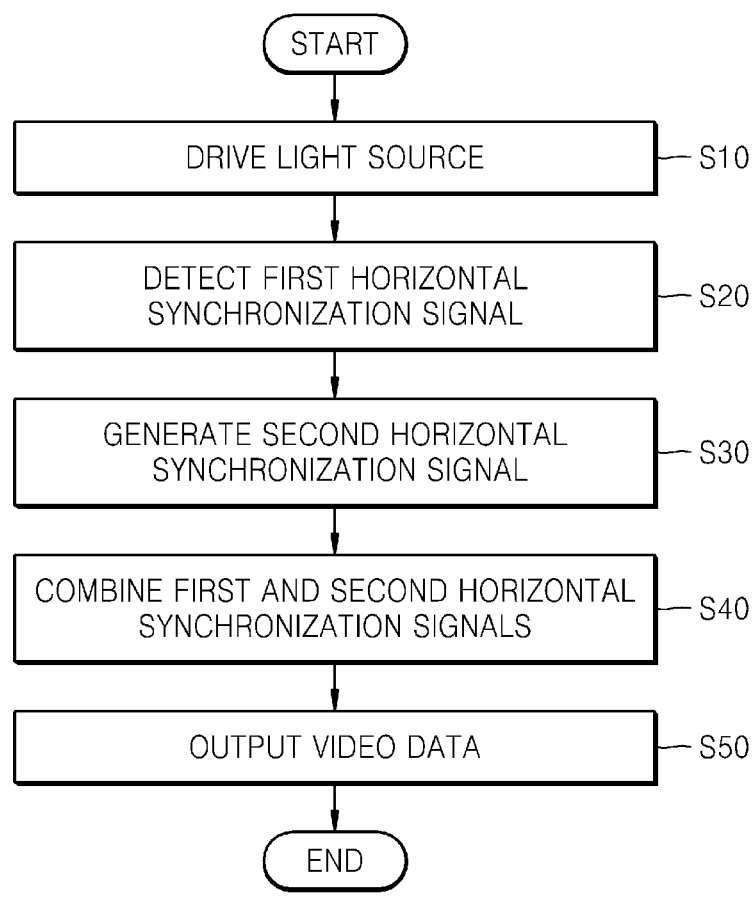
FIG. 5 is a flowchart of a method of processing a horizontal synchronization signal according to an embodiment.

FIG. 5 is a flowchart of a method of processing a horizontal synchronization signal, according to an embodiment, and FIGS. 6A through 6D illustrate an example of processing a horizontal synchronization signal and video data;

Referring to FIGS. 1 through 6D, first, when a printing command is input to the video signal processor 200 of the electrophotographic image forming apparatus, a motor for driving the polygonal rotating mirror 150 of the light scanning unit 100 is driven so as to check a state of the motor. When the motor of the polygonal rotating mirror 150 is normally driven, the video signal processor 200 enables a power supply signal of the light source 110 and enables a sample & hold signal so that the light source 110 may emit a light beam L (S10).

Figure 6A:
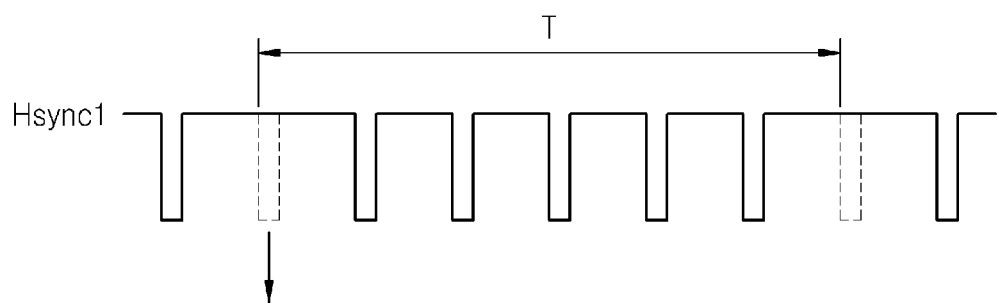
FIGS. 6A through 6D are examples of processing of a horizontal synchronization signal and video data.

The light beam L is deflected by the polygonal rotating mirror 150 and scanned to the scanned surface 180. In this case, when the light beam L is reflected off the remaining reflective surfaces 152 and not the reference surface 151 of the polygonal rotating mirror 150, the synchronization detecting light beam L' corresponding to a start point of scanning of the light beam L propagates towards the synchronization detecting sensor 160, and the synchronization detecting sensor 160 detects the first horizontal synchronization signal Hsync1 (S20). The first horizontal synchronization signal Hsync1 is input to the video signal processor 200. Since the first horizontal synchronization signal Hsync1 is not detected for the reference surface 151 of the polygonal rotating mirror 150, N−1 first horizontal synchronization signals Hsync1 are generated for N reflective surfaces of the polygonal rotating mirror 150 during one rotation of the polygonal rotating mirror 150. That is, when the polygonal rotating mirror 150 is a hexagon mirror, the number of first horizontal synchronization signals Hsync1 generated during one rotation period T of the polygonal rotating mirror 150 is 5, as shown in FIG. 6A.

Figure 6B:
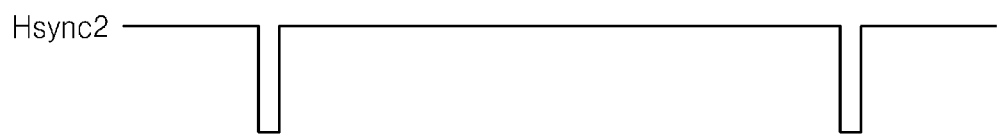
Figure 6C:
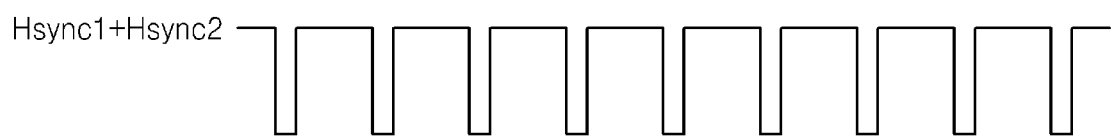

The second horizontal synchronization signal generating unit 210 of the video signal processor 200 produces a second horizontal synchronization signal Hsync2 based on the sequentially input first horizontal synchronization signals Hsync1 and preset information about period of a horizontal synchronization signal (S30). For example, as shown in FIGS. 6A and 6B, a time interval between sequentially input first horizontal synchronization signals Hsync1, which is twice the preset period of a horizontal synchronization signal, may occur once during one rotation period T of the polygonal rotating mirror 150. The second horizontal synchronization signal generating unit 210 generates the second horizontal synchronization signal Hsync2 during the time interval. Thus, five first horizontal synchronization signals Hsync1 and one second horizontal synchronization signal Hsync2 are generated during one rotation period T of the polygonal rotating mirror 150 and sequentially transferred to the video controller 220.

Since the second horizontal synchronization signal Hsync2 is generated once during one rotation period T of the polygonal rotating mirror 150, the second horizontal synchronization signal Hsync2 may be deemed as a horizontal synchronization signal for the reference surface 151 of the polygonal rotating mirror 150. The second horizontal synchronization signal Hsync2 may be used as a reference for compensating for degradation in image quality due to non-uniform deformations of the reflective surfaces 151 and 152 of the polygonal rotating mirror 150.

The first horizontal synchronization signal Hsync1 detected by the synchronization detecting sensor 160 is combined with the second horizontal synchronization signal Hsync2 generated by the second horizontal synchronization signal generating unit 210 to obtain a complete horizontal synchronization signal (Hsync1 +Hsync2) which is then input to the video controller (S40).

Figure 6D:
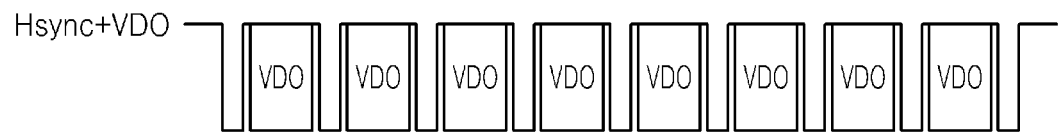

Referring to FIG. 6D, the video controller 220 transmits the input video data VDO to the LDD 190 in synchronization with the first and second horizontal synchronization signals Hsync1 and Hsync2 (S50). The LDD 190 drives an on/off operation of the light source 110 according to the input video data VDO. A light beam L emitted from the light source 110 in response to the video data forms an electrostatic latent image on the scanned surface 180. The above operations may be repeated until scanning is terminated.

A period of the first synchronization signal Hsync1 detected by the synchronization detecting sensor 160 may vary slightly according to processing states of angles between adjacent reflective surfaces 151 and 152 of the polygonal rotating mirror 150. This may adversely affect image quality and degrade print quality. Since the electrophotographic image forming apparatus according to an embodiment may recognize the reference surface 151 of the polygonal rotating mirror 150, it is possible to correct video data for each line in a printed image based on the reference surface 151 and thus improve the image quality. Correction of the video data for each line may be achieved by reading an image of a pattern recorded on a photosensitive drum or an intermediate transfer belt (not shown) and aligning video data in the main scanning direction. On the other hand, in a conventional image forming apparatus, which cannot recognize a reference surface of a polygonal rotating mirror, it is not possible to compensate for an image in the main scanning direction so as to suppress degradation in image quality due to non-uniform deformations of reflective surfaces.

The light scanning unit 100 uses the single polygonal rotating mirror 150 to deflect and scan a single light beam L. Thus, the electrophotographic image forming apparatus may be a mono mode image forming apparatus for producing a black and white image.

Alternatively, the electrophotographic image forming apparatus according to an embodiment may include light scanning units 100 and video signal processors 200 for the respective colors of black (K), cyan (C), magenta (M), and yellow (Y). More specifically, four light scanning units 100 are provided to scan four light beams L and detect first horizontal synchronization signals Hsync1 regarding the four light beams L. The video signal processor 200 generates a second horizontal synchronization signal Hsync2 for each light scanning unit 100 and processes video data VOD in synchronization with the first and second synchronization signals Hsync1 and Hsync2. In this case, the video signal processors 200 for the respective light scanning units 100 may be integrated into a single circuit.

Figure 7:
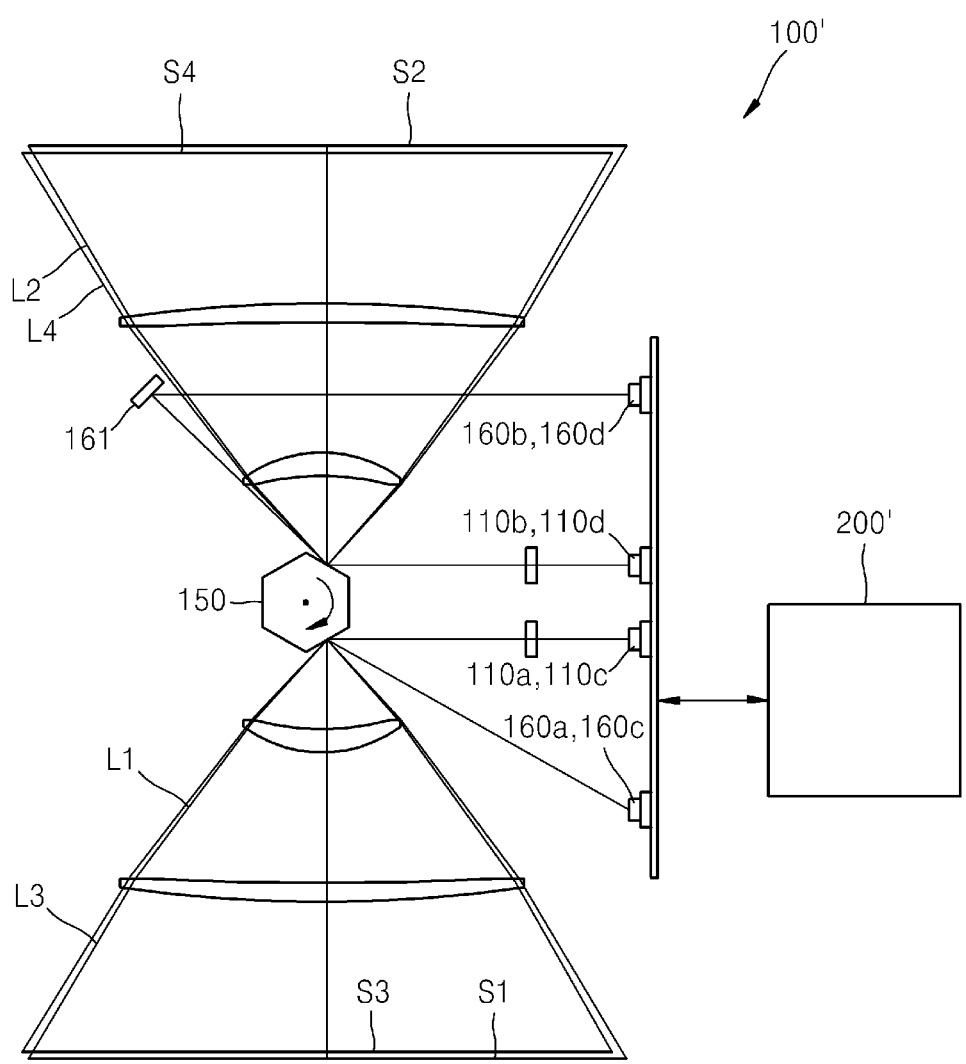
FIG. 7 is a diagram of an electrophotographic image forming apparatus according to an embodiment.

FIG. 7 is a diagram of an electrophotographic image forming apparatus according to an embodiment.

Referring to FIG. 7, the electrophotographic image forming apparatus according to an embodiment is a color image forming apparatus including a light scanning unit 100' for scanning four light beams L1, L2, L3, and L4 and a video signal processor 200' for transmitting video data to the light scanning unit 100'.

The light scanning unit 100' includes light sources 110a, 110b, 110c, and 110d for the respective colors of black (K), cyan (C), magenta (M), and yellow (Y) and one polygonal rotating mirror 150 having the same configuration as in the previous embodiment.

Two of the four light beams L1, L2, L3, and L4 emitted from the four light sources 110a, 110b, 110c, and 110d may be incident on each reflective surface of the polygonal rotating mirror 150. For example, two light beams L1 and L3 may be incident obliquely at different angles on one reflective surface of the polygonal rotating mirror 150 in the sub scanning direction. Likewise, the remaining two light beams L2 and L4 may be incident obliquely at different angles on another reflective surface of the polygonal rotating mirror 150 in the sub scanning direction. The four light beams L1, L2, L3, and L4 are deflected and scanned by the polygonal rotating mirror 150 and imaged on different scanned surfaces S1, S2, S3, and S4, respectively. The polygonal rotating mirror 150 simultaneously deflects and scans the four light beams L1, L2, L3, and L4. Since the four light beams L1, L2, L3, and L4 are converged on the different scanned surfaces S1, S2, S3, and S4, respectively, to thereby form images thereon, synchronization detecting sensors 160a, 160b, 160c, and 160d may be provided for the four light beams L1, L2, L3, and L4, respectively. A reflective mirror 161 may be disposed on a light path near a start point of scanning of the light beams L2 and L4. The presence of the reflective mirror 161 may alleviate a limitation on the arrangement of the synchronization detecting sensors 160b and 160d for the light beams L2 and L4 so that the synchronization detecting sensors 160a, 160b, 160c, and 160d and the light sources 110a, 110b, 110c, and 110d are mounted together on the same substrate.

For first horizontal synchronization signals detected by the respective synchronization detecting sensors 160a, 160b, 160c, and 160d, the video signal processor 200' generates second horizontal synchronization signals corresponding to the reference surface (151 in FIG. 2) of the polygonal rotating mirror 150, respectively, in substantially the same manner as in the previous embodiment. Furthermore, since the video signal processor 200' may also recognize the reference surface 151 of the polygonal rotating mirror 150 in the same manner as described in the previous embodiment, it is possible to compensate for video data for each line in a printed image corresponding to each color based on the reference surface 151 and improve image quality.

Although the synchronization detecting sensors 160a, 160b, 160c, and 160d are provided for the respective four light beams L1, L2, L3, and L4, embodiments are not limited thereto. For example, a horizontal synchronization signal may be detected regarding one of a pair of light beams (e.g., L1 and L3) incident on the same reflective surface of the polygonal rotating mirror 150, and video data may be processed regarding the other light beam based on the horizontal synchronization signal. Furthermore, since the light scanning unit 100' uses one polygonal rotating mirror 150, a horizontal synchronization signal may be detected regarding only one of the four light beams L1, L2, L3, and L4, and video data may be processed regarding the remaining light beams based on the horizontal synchronization signal. In either case, since the video signal processor 200' is able to recognize the reference surface 151 of the polygonal rotating mirror 150, it may be possible to correct video data for each line in a printed image corresponding to each color based on the reference surface 151 and enhance the image quality.

Figure 8:
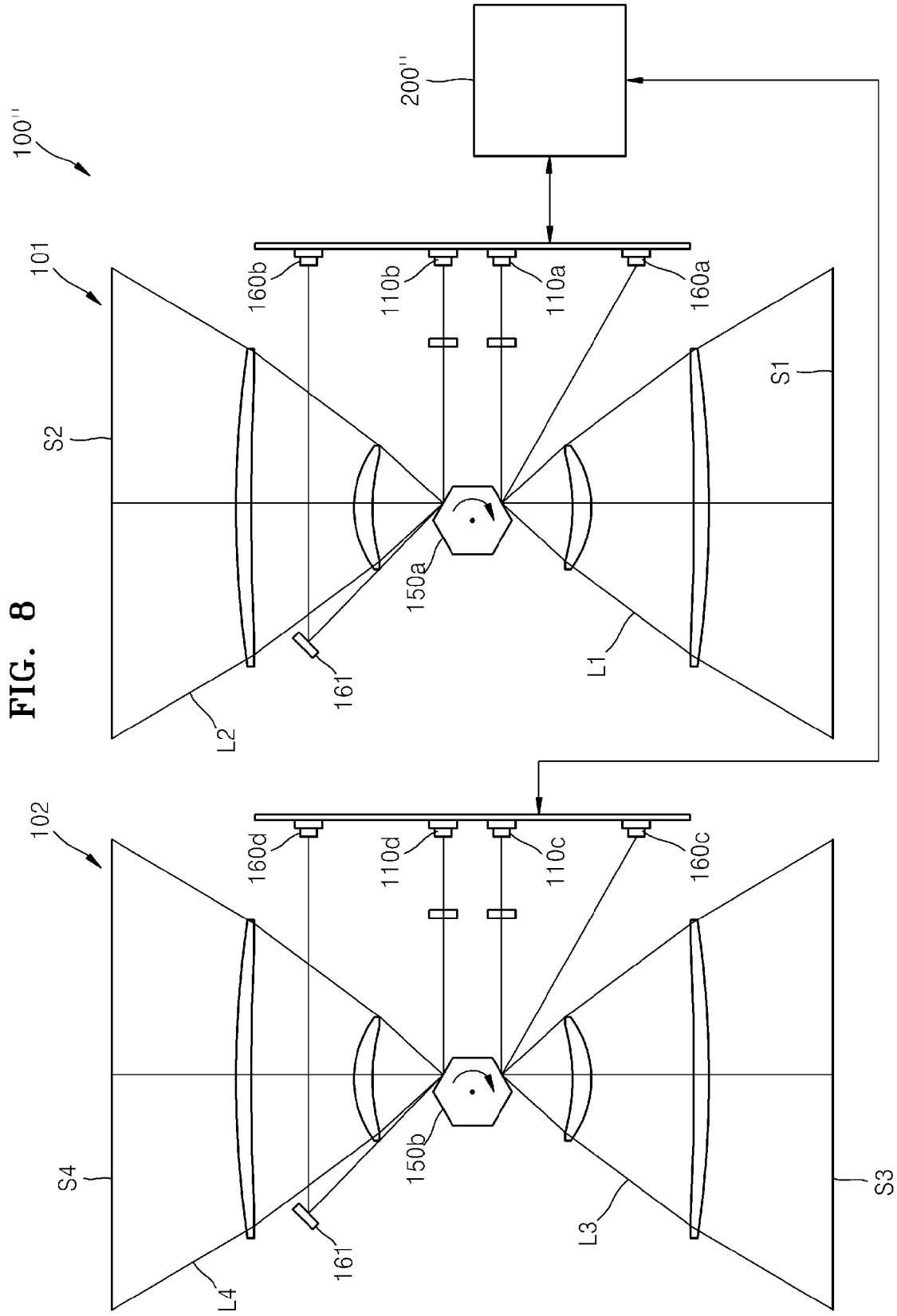
FIG. 8 is a structural view of an electrophotographic image forming apparatus according to an embodiment.

FIG. 8 is a structural view of an electrophotographic image forming apparatus 100" according to an embodiment.

Referring to FIG. 8, the electrophotographic image forming apparatus according to an embodiment includes a light scanning unit 100" for scanning four light beams L1, L2, L3, and L4 and a video signal processor 200" for transmitting video data to the light scanning unit 100". The light scanning unit 100" includes first and second sub light scanning modules 101 and 102.

The first sub light scanning module 101 scans two light beams L1 and L2 by using one polygonal rotating mirror 150a. The second sub light scanning module 102 scans the remaining two light beams L3 and L4 by using the other polygonal rotating mirror 150b. The first sub light scanning module 101 includes synchronization detecting sensors 160a and 160b for detecting synchronization signals regarding the light beams L1 and L2, respectively. Similarly, the second sub light scanning module 102 includes synchronization detecting sensors 160c and 160d for detecting synchronization signals regarding the light beams L3 and L4, respectively. The polygonal rotating mirrors 150a and 150b may have substantially the same configuration as the polygonal rotating mirror 150 of FIG. 2. In other words, each of the polygonal rotating mirror 150a and 150b may include a reference surface (151 in FIG. 2) having a non-reflective region.

For first horizontal synchronization signals detected by the respective synchronization detecting sensors 160a, 160b, 160c, and 160d, the video signal processor 200" may generate second horizontal synchronization signals corresponding to the reference surfaces (151 in FIG. 2) of the polygonal rotating mirrors 150a and 150b, respectively, in substantially the same manner as in the previous embodiments. Furthermore, since the video signal processor 200" is also able to recognize the reference surface 151 of the polygonal rotating mirror 150 in the same manner as described in the previous embodiment, it is possible to compensate for video data for each line in a printed image corresponding to each color based on the reference surface and improve image quality.

Although the synchronization detecting sensors 160a, 160b, 160c, and 160d are provided for the respective four light beams L1, L2, L3, and L4, embodiments are not limited thereto. For example, since one of the polygonal rotating mirrors 105a and 105b is provided for each of the first and second sub light scanning modules 101 and 102, a single synchronization detecting sensor may be disposed in each of the first and second sub light scanning modules 101 and 102. For example, in the first sub light scanning module 101, a horizontal synchronization signal may be detected regarding one of the two light beams L1 and L2, and video data may be processed regarding the other light beam based on the horizontal synchronization signal. In this case as well, since the video signal processor 200" is able to recognize a reference surface of each of the polygonal rotating mirrors 150a and 150b, it may be possible to correct video data for each line in a printed image corresponding to each color based on the reference surface and increase the image quality.

Although the polygonal rotating mirror 150 has been described to have 6 reflective surfaces, embodiments are not limited thereto. For example, the polygonal rotating mirror 150 may have four, five, seven or more reflective surfaces. Furthermore, while the non-reflective region 151a of the reference surface 151 is disposed toward a start point of scanning, the non-reflective region 151a may be located toward an end point of the scanning or at both the start and end points thereof.

Figure 9:
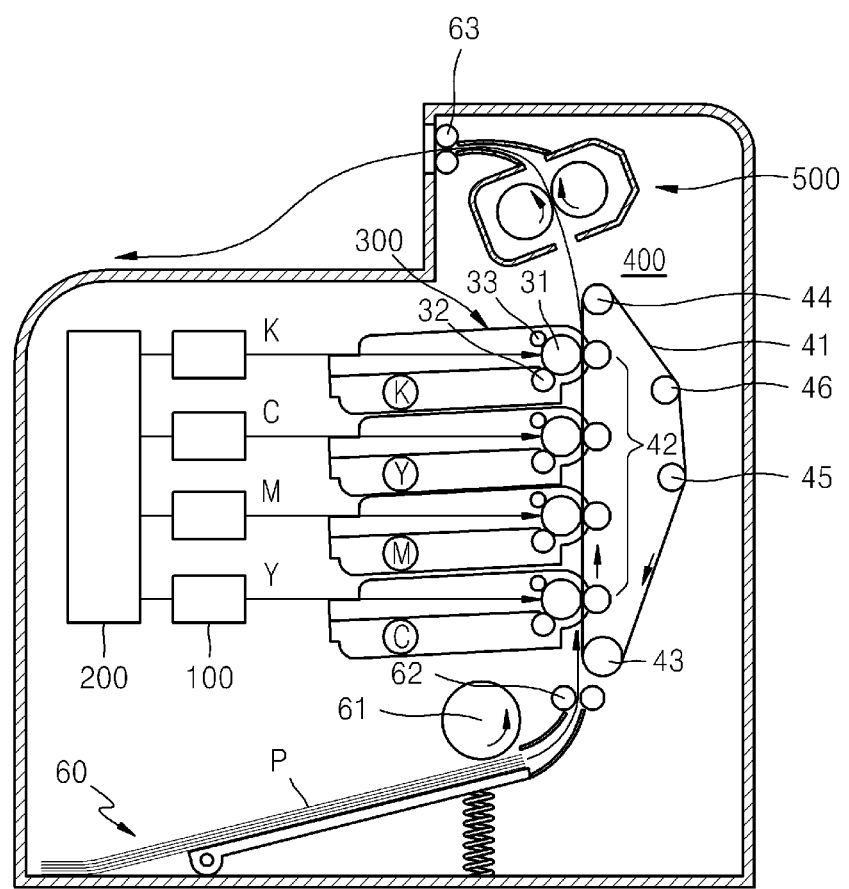
FIG. 9 is a diagram of an electrophotographic image forming apparatus according to an embodiment.

FIG. 9 is a diagram of an electrophotographic image forming apparatus according to an embodiment. The electrophotographic image forming apparatus according to an embodiment may be various types of equipment such as printers, facsimile machines, copiers, or duplicators.

Referring to FIG. 9, the electrophotographic image forming apparatus according to an embodiment includes four light scanning units 100, a video signal processor 200, develop devices 300, a transfer device 400, and a fixing device 500.

In order to print color images, the four light scanning units 100 are provided to scan four light beams corresponding to the respective colors of black (K), cyan (C), magenta (M), and yellow (Y). The video signal processor 200 is a single circuit by integrating video signal processors provided for the respective light scanning units 100. The light scanning units 100 and the video signal processor 200 have substantially the same configurations as those of their counterparts described with reference to FIGS. 1 through 6. If necessary, as described above with reference to FIG. 7 or 8, the light scanning unit 100' including one polygonal rotating mirror 150 for four light beams and the video signal processor 200' may be used, or the light scanning unit 100" including two polygonal mirrors 150a and 150b, one for two light beams, and the video signal processor 200" may be used.

The develop devices 300 may be provided for the respective colors of black (K), cyan (C), magenta (M), and yellow (Y). Each of the develop devices 300 includes a photosensitive drum 31 as an image receptor on which an electrostatic latent image is formed, and a develop roller 32 for developing the electrostatic latent image.

The photosensitive drum 31 is an example of a photosensitive medium, and is formed by forming a photosensitive layer on an outer circumference surface of a cylindrical metal pipe to a predetermined thickness. Although not shown, a photosensitive belt having a belt shape may be used as a photosensitive medium. Outer circumference surfaces of the photosensitive drums 31 correspond to the scanned surface (180 in FIG. 1) or the scanned surfaces (S1, S2, S3, and S4 in FIGS. 7 and 8). A charging roller 33 is positioned near a region upstream from a portion of the outer circumference surface of each photosensitive drum 31 exposed by the corresponding light scanning unit 100. The charging roller 33 is an example of a charger for charging a surface of the photosensitive drum 31 while contacting the photosensitive drum 31 and rotating against the photosensitive drum 31. A charging bias is applied to the charging roller 33. A corona charger (not shown) may be used instead of the charging roller 33.

The develop roller 32 supplies toner attached to an outer circumference surface thereof to the photosensitive drum 31. A developing bias for supplying the toner to the photosensitive drum 31 is applied to the develop roller 32. Although not shown, each of the develop devices 300 may further include a supply roller for attaching toner accommodated therein to the develop roller 32, a regulator for regulating an amount of the toner attached to the develop roller 32, a supply roller for supplying the toner, and/or a stirrer for moving the toner towards the develop roller 32.

The transfer device 400 may include an intermediate transfer belt 41 and four transfer rollers 42. The intermediate transfer belt 41 is disposed on opposite portions of the outer circumference surfaces of the photosensitive drums 31, which are exposed out of the develop devices 300. The intermediate transfer belt 41 is supported by a plurality of support rollers 43, 44, 45, and 46, and is circulated. The four transfer rollers 42 face the photosensitive drums 31 of the develop devices 300, with the intermediate transfer belt 41 interposed therebetween. A transfer bias is applied to the transfer rollers 42.

A process of forming a color image by using the above-described structure is as follows:

The photosensitive drums 31 of the develop devices 300 are charged with a uniform potential by a charging bias applied to the charging rollers 33. The light scanning units 100 scan four light beams corresponding to image information of black (K), cyan (C), magenta (M), and yellow (Y) to the photosensitive drums 31 of the develop devices 300 to form electrostatic latent images. A develop bias is applied to the develop rollers 32. Then, the toner attached to the outer circumference surfaces of the develop rollers 32 is attached to the electrostatic latent images to thereby form toner images of black (K), cyan (C), magenta (M), and yellow (Y) on the respective photosensitive drums 31 of the develop devices 300.

A medium for finally receiving the toner, e.g., a sheet of printing paper P, is drawn out of a cassette 60 by a pickup roller 61. The printing paper P is placed on the intermediate transfer belt 41 by a transport roller 62. The sheet of printing paper P is attached to a surface of the intermediate transfer belt 41 by an electrostatic force, and is transported at the same speed as a linear speed of the intermediate transfer belt 41.

For example, when a front end of the toner image of cyan (C) formed on the outer circumference surface of the corresponding photosensitive drum 31 of the develop device 300 reaches a transfer nip facing the transfer roller 42 corresponding to the photosensitive drum 31, a front end of the sheet of printing paper P reaches the transfer nip. When a transfer bias is applied to the transfer roller 42, the toner image formed on the photosensitive drum 31 is transferred onto the sheet of printing paper P. As the printing paper P is transported, the toner images of black (K), cyan (C), magenta (M), and yellow (Y) formed on the photosensitive drums 31 of the develop devices 300 are sequentially transferred onto the sheet of printing paper P so as to overlap with each other, thereby creating a color toner image on the sheet of printing paper P.

The color toner image transferred onto the sheet of printing paper P is maintained on a surface of the sheet of printing paper P by an electrostatic force. The fixing device 500 fixes the color toner image on the sheet of printing paper P by using heat and pressure. The sheet of printing paper P is ejected out of the image forming apparatus by an ejection roller 63.

While the polygonal rotating mirror, the light scanning unit employing the same, and the electrophotographic image forming apparatus according to one or more exemplary embodiments have been particularly shown and described with reference to exemplary embodiments thereof, it will be understood by those of ordinary skill in the art that various changes in form and details may be made therein without departing from the spirit and scope of the present disclosure as defined by the following claims and their equivalents.

What is claimed is:

1. A polygonal rotating mirror employed in a light scanning unit for scanning a light beam, the polygonal rotating mirror comprising:
    a plurality of reflective surfaces enclosing outer side surfaces thereof,
    wherein one of the plurality of reflective surfaces is a reference surface, a region of the reference surface where the light beam for a synchronization signal is to be incident is formed as a non-reflective region, and regions of the remaining reflective surfaces of the plurality of reflective surfaces where the light beam for the synchronization signal is to be incident, are formed as reflective regions,
    wherein the non-reflective region is darker than the reflective regions.

2. The polygonal rotating mirror of claim 1, wherein the non-reflective region of the reference surface is disposed in proximity to an edge of the reference surface.

3. The polygonal rotating mirror of claim 1, wherein the non-reflective region of the reference surface is disposed at a starting position of the reference surface with respect to a rotation direction of the polygonal rotating mirror.

4. A light scanning unit comprising:
a light source unit which emits a light beam;
a polygonal rotating mirror including a plurality of reflective surfaces enclosing outer side surfaces thereof, which deflects and scans the light beam emitted by the light source unit in a main scanning direction; and
a synchronization detecting sensor which receives a portion of the light beam reflected by the polygonal rotating mirror and which generates a first horizontal synchronization signal,
wherein one of the plurality of reflective surfaces is a reference surface, a region of the reference surface where the light beam for a synchronization signal is to be incident is formed as a non-reflective region, and regions of the remaining reflective surfaces of the plurality of reflective surfaces where the light beam for the synchronization signal is to be incident, are formed as reflective regions,
wherein the non-reflective region is darker than the reflective regions.

5. The light scanning unit of claim 4, wherein the non-reflective region of the reference surface is disposed in proximity to an edge of the reference surface.

6. The light scanning unit of claim 4, wherein the non-reflective region of the reference surface is disposed at a starting position of the reference surface with respect to a rotation direction of the polygonal rotating mirror.

7. The light scanning unit of claim 4, wherein the light source unit includes a single light source which emits the light beam.

8. The light scanning unit of claim 4, wherein the light source unit includes four light sources, each light source emitting one light beam, and
wherein two light beams of the four light beams emitted by the light source unit are deflected and scanned by one reflective surface of the polygonal rotating mirror, and the remaining two light beams are deflected and scanned by another reflective surface of the polygonal rotating mirror.

9. The light scanning unit of claim 4, further comprising a second polygonal rotating mirror, wherein:
the light source unit includes four light sources, each light source emitting one light beam,
two light beams of the four light beams emitted by the light source unit are deflected and scanned by different reflective surfaces of the polygonal rotating mirror, and
the remaining two light beams are deflected and scanned by different reflective surfaces of the second polygonal mirror.

10. An electrophotographic image forming apparatus comprising:
a light scanning unit which scans a light beam, wherein the light scanning unit comprises:
a light source unit which scans a light beam; a polygonal rotating mirror including a plurality of reflective surfaces enclosing outer side surfaces thereof, which deflects and scans the light beam emitted by the light source unit in a main scanning direction; and a synchronization detecting sensor which receives a portion of the light beam reflected by the polygonal rotating mirror and which generates a first horizontal synchronization signal, wherein one of the plurality of reflective surfaces is a reference surface, a region of the reference surface where the light beam for a synchronization signal is to be incident is formed as a non-reflective region, and regions of the remaining reflective surfaces of the plurality of reflective surfaces where the light beam for the synchronization signal is to be incident, are formed as reflective regions, and
a video signal processor comprising a second horizontal synchronization signal generating unit which counts a synchronization signal offset upon receiving the first horizontal synchronization signal from the synchronization detecting sensor and which generates a second horizontal synchronization signal regarding the reference surface, and a video controller which transfers video data to the light scanning unit based on the first and second horizontal synchronization signals,
wherein the non-reflective region is darker than the reflective regions.

11. The apparatus of claim 10, wherein the non-reflective region of the reference surface is disposed in proximity to an edge of the reference surface.

12. The apparatus of claim 11, further comprising a second polygonal rotating mirror, wherein:
the light source unit includes four light sources, each light source emitting one light beam,
two light beams of the four light beams emitted by the light source unit are deflected and scanned by different reflective surfaces of the polygonal rotating mirror, and
the remaining two light beams are deflected and scanned by different reflective surfaces of the second polygonal mirror.

13. The apparatus of claim 10, wherein the non-reflective region of the reference surface is disposed at a starting position of the reference surface with respect to a rotation direction of the polygonal rotating mirror.

14. The apparatus of claim 10, wherein the light source unit includes a single light source which emits the light beam.

15. The apparatus of claim 10, wherein the light source unit includes four light sources, each light source emitting one light beam, and
wherein two light beams of the four light beams emitted by the light source unit are deflected and scanned by one reflective surface of the polygonal rotating mirror, and the remaining two light beams are deflected and scanned by another reflective surface of the polygonal rotating mirror.

16. The apparatus of claim 10, wherein the second horizontal synchronization signal generating unit counts one preset period of a horizontal synchronization signal as the synchronization signal offset.

17. The apparatus of claim 10, wherein the video signal processor is a central processing unit (CPU) or a hyper print video controller (HPVC).

18. The apparatus of claim 10, further comprising:
develop devices which develop electrostatic latent images formed by exposing light beams scanned by the light scanning unit and form a toner image;
a transfer device which transfers the toner image onto a printing medium; and
a fixing device which fixes the transferred toner image on the printing medium.

* * * * *